(12) United States Patent
Shim et al.

(10) Patent No.: US 11,190,280 B2
(45) Date of Patent: Nov. 30, 2021

(54) METHOD AND APPARATUS FOR CONTROLLING INTERFERENCE DUE TO ATMOSPHERIC DUCTING IN WIRELESS COMMUNICATION SYSTEM

(71) Applicant: Samsung Electronics Co., Ltd., Suwon-si (KR)

(72) Inventors: Seijoon Shim, Suwon-si (KR); Hayoung Yang, Suwon-si (KR); Joohyun Lee, Suwon-si (KR); Kilsik Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,530

(22) Filed: May 7, 2020

(65) Prior Publication Data
US 2020/0358537 A1 Nov. 12, 2020

(30) Foreign Application Priority Data
May 8, 2019 (KR) .................. 10-2019-0053955

(51) Int. Cl.
| | |
|---|---|
| *H04B 17/11* | (2015.01) |
| *H04W 24/02* | (2009.01) |
| *H04B 15/00* | (2006.01) |
| *H04B 7/06* | (2006.01) |
| *H04L 25/02* | (2006.01) |

(52) U.S. Cl.
CPC .......... *H04B 15/00* (2013.01); *H04B 7/0617* (2013.01); *H04L 25/0202* (2013.01)

(58) Field of Classification Search
CPC ..... H04W 16/28; H04W 24/06; H04W 24/10; H04B 7/06; H04B 7/061; H04B 17/00; H04B 17/0082; H04B 17/12; H04B 17/24; H04B 17/309; H04B 17/11; H04L 25/0202

See application file for complete search history.

(56) References Cited

U.S. PATENT DOCUMENTS

| | | |
|---|---|---|
| 6,304,760 B1 | 10/2001 | Thomson et al. |
| 9,571,205 B1 | 2/2017 | Suarez et al. |
| 9,831,901 B2 | 11/2017 | Kpodzo et al. |
| 10,034,181 B1 * | 7/2018 | Somashekar ......... H04W 24/02 |
| 2013/0272189 A1 | 10/2013 | Lee et al. |
| 2014/0086089 A1 * | 3/2014 | Huang ................ H04W 72/085 |
| | | 370/252 |

(Continued)

OTHER PUBLICATIONS

International Search Report of the International Searching Authority in connection with International Application No. PCT/KR2020/006044 dated Aug. 24, 2020, 3 pages.

*Primary Examiner* — Blane J Jackson

(57) ABSTRACT

The disclosure relates to detection and control of remote interference due to an atmospheric ducting phenomenon. More specifically, a method of a first base station, according to one embodiment of the disclosure, for controlling interference due to atmospheric ducting in a wireless communication system includes: receiving a sequence from at least one second base station; identifying the at least one second base station corresponding to the sequence; estimating a channel for the at least one identified second base station, based on the sequence; and controlling a beam in a direction corresponding to the at least one identified second base station, based on a result of the channel estimation.

20 Claims, 20 Drawing Sheets

(56) References Cited

U.S. PATENT DOCUMENTS

| | | |
|---|---|---|
| 2015/0230259 A1 | 8/2015 | Park et al. |
| 2018/0139628 A1 | 5/2018 | Choi et al. |
| 2019/0342057 A1* | 11/2019 | Rico Alvarino ...... H04L 5/1461 |
| 2020/0106589 A1* | 4/2020 | Xu ........................ H04W 76/11 |

* cited by examiner

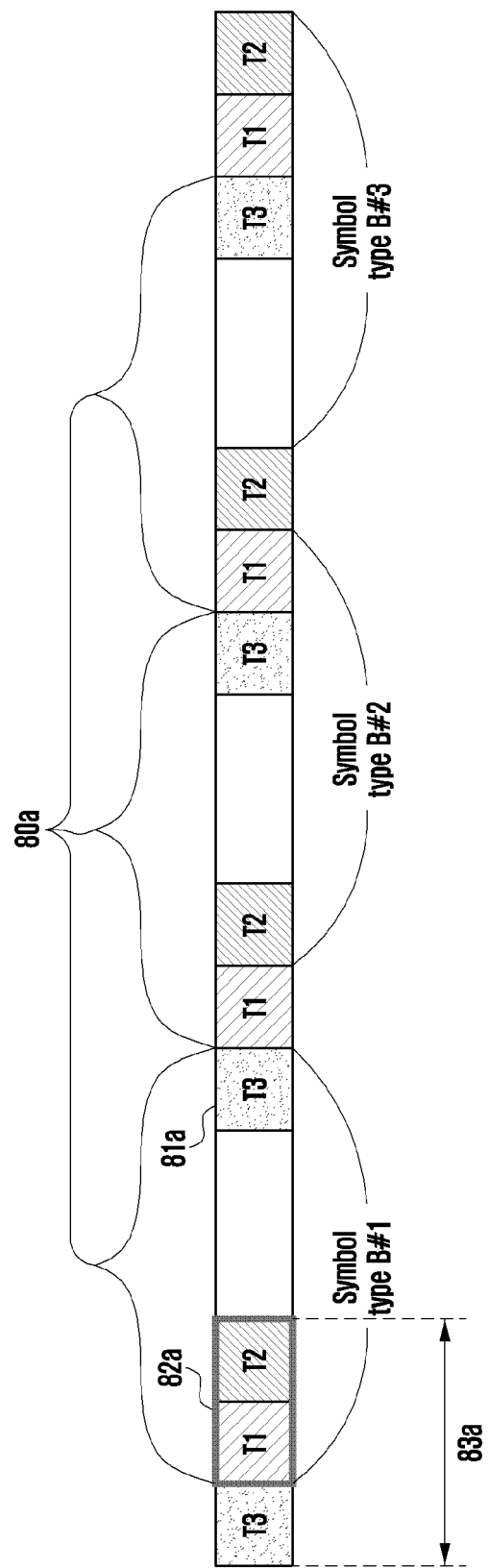

METHOD AND APPARATUS FOR CONTROLLING INTERFERENCE DUE TO ATMOSPHERIC DUCTING IN WIRELESS COMMUNICATION SYSTEM

CROSS-REFERENCE TO RELATED APPLICATION

This application is based on and claims priority under 35 U.S.C. § 119 to Korean Patent Application No. 10-2019-0053955, filed on May 8, 2019, in the Korean Intellectual Property Office, the disclosure of which is herein incorporated by reference in its entirety.

BACKGROUND

1. Field

The present disclosure relates to detection and control of remote interference due to an atmospheric ducting phenomenon.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Even if a synchronized time division communication technique between a plurality of base stations is implemented by an operator, under specific local conditions or weather conditions, for example, when the air density is low, as in a high-altitude region, a phenomenon in which a downlink signal of one base station acts as interference on an uplink signal with respect to a remote base station may occur. This phenomenon is referred to as an atmospheric ducting phenomenon, and when such interference occurs, how to control the corresponding interference may be a problem.

The above information is presented as background information only to assist with an understanding of the disclosure. No determination has been made, and no assertion is made, as to whether any of the above might be applicable as prior art with regard to the disclosure.

SUMMARY

Certain embodiments according to this disclosure is to provide signaling and an interface for measuring and detecting interference due to an atmospheric ducting phenomenon, which affects an uplink of a base station.

In addition, certain embodiments according to this disclosure is to provide a method and apparatus for detecting interference and applying a control action to a cell operation.

In accordance with the above, a method of a first base station, according to various embodiments, for controlling interference due to atmospheric ducting in a wireless communication system may include receiving a sequence from at least one second base station, identifying the at least one second base station corresponding to the sequence; estimating a channel for the at least one identified second base station, based on the sequence, and controlling a beam in a direction corresponding to the at least one identified second base station, based on a result of the channel estimation.

In addition, a first base station, according to various embodiments, for controlling interference due to atmospheric ducting in a wireless communication system may include a transceiver and a controller which controls the transceiver to receive a sequence from at least one second base station, identifies the at least one second base station corresponding to the sequence, estimates a channel for the at least one identified second base station, based on the sequence, and controls a beam in a direction corresponding to the at least one identified second base station, based on a result of the channel estimation.

According to various embodiments, another base station, which causes interference with an uplink signal with respect to one base station, can be accurately identified, and thus the remote interference (interference due to an atmospheric ducting phenomenon) can be more effectively controlled.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 8A is a diagram illustrating an example of symbols corresponding to three sequences, which are connected according to various embodiments of this disclosure;

and

Figure 18:
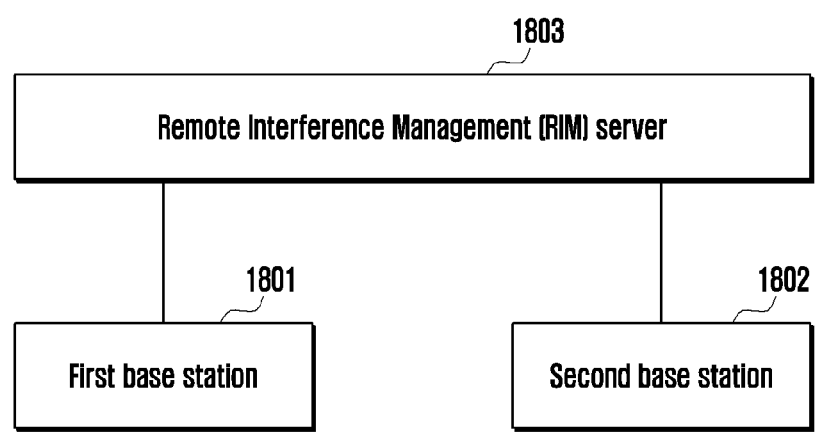

FIG. 18 illustrates an example of a the relationship between a central server and base stations according to various embodiments of this disclosure.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Further, in describing embodiments of the disclosure, based on determinations by those skilled in the art, the main idea of the disclosure may be applied to other communication systems having similar technical backgrounds and channel types through some modifications without significantly departing from the scope of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors.

Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, referring to drawings attached to the specification, a method, according to various embodiments of this disclosure, for detecting and determining whether cell performance deteriorates will be described in detail.

Figure 1:
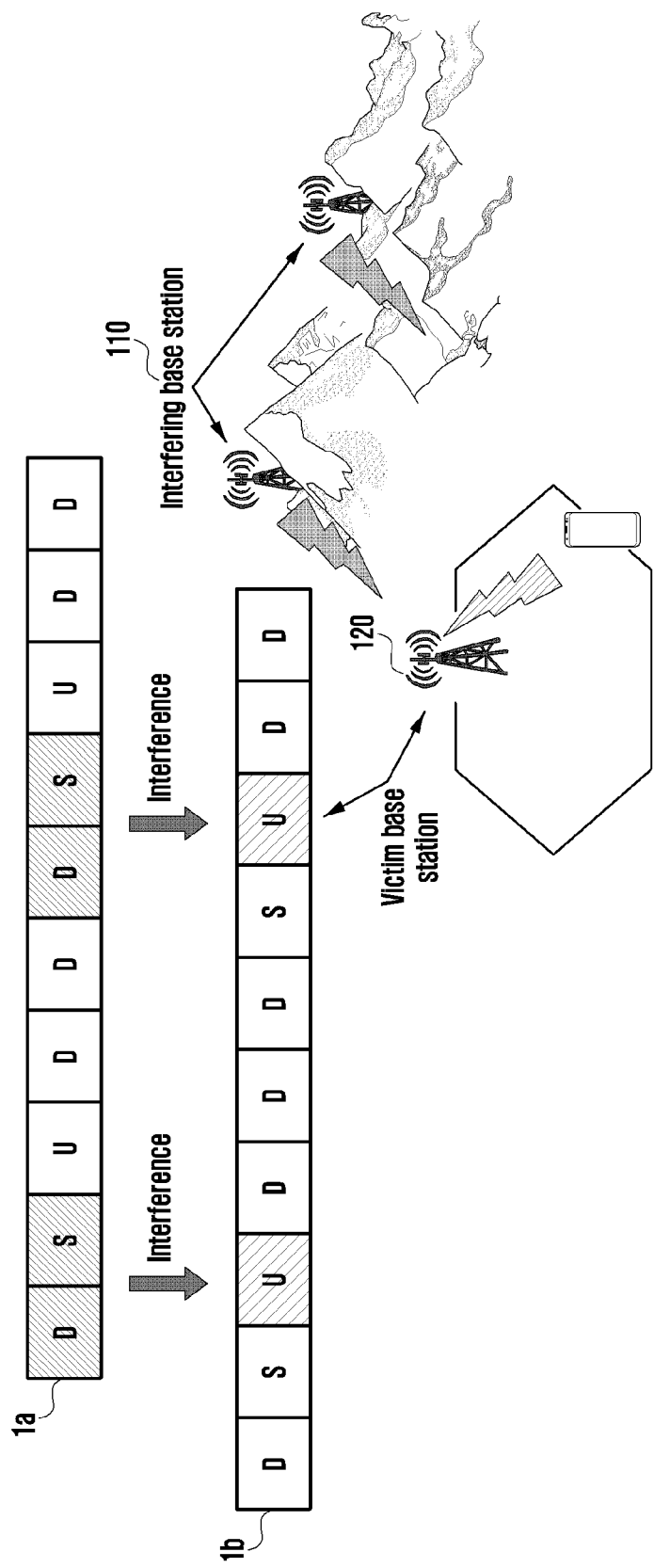
FIG. 1 is a conceptual diagram illustrating an example of an interference phenomenon due to an atmospheric ducting phenomenon between base stations.

FIG. 1 is a conceptual diagram illustrating an example of an interference phenomenon due to an atmospheric ducting phenomenon between base stations.

Referring to FIG. 1, when an atmospheric ducting phenomenon occurs, at least one base station may be an interfering base station 110 which causes interference, and at least one other base station may be a victim base station 120 which is interfered with by the interfering base station 110. When the interfering base station 110 and the victim base station 120 are operated by an operator in the same time-division duplexing (TDD) mode, due to the atmospheric ducting phenomenon, a signal 1a of the interfering base station 110 may interfere with a signal 1b of the victim base station 120, which is remotely located.

For example, when a signal corresponding to one radio frame of the interfering base station 110 is the same as the signal 1a illustrated in FIG. 1 and a signal corresponding to one radio frame of the victim base station 120 is the same as the signal 1b illustrated in FIG. 1, downlink subframes of the interfering base station 110 may interfere with uplink subframes of the victim base station 120. This is because, due to the atmospheric ducting phenomenon, the signal 1a moves a long distance and is thus delayed on a time domain. Therefore, the first subframe and the second subframe of the signal 1a may interfere with the third subframe of the signal 1b, and the sixth subframe and the seventh subframe of the signal 1a may interfere with the eighth subframe of the signal 1b.

In an existing LTE system, there is no signal for detecting such remote interference due to the atmospheric ducting phenomenon. That is, in the event of remote interference, it may be necessary to identify which downlink subframe interferes with an uplink subframe and control a transmitting/receiving operation of a corresponding base station, but since there is no signal for detecting such interference, control of a transmitting/receiving operation of a corresponding base station is not smoothly performed. Accordingly, the disclosure provides a method for detecting remote interference caused by an atmospheric ducting phenomenon and then providing a framework applicable to cell operation, thus enabling effective control, by operators, of remote interference.

Hereinafter, referring to the attached drawings, a method, according to various embodiments of this disclosure, for detecting and controlling interference due to an atmospheric ducting phenomenon will be described in more detail. For convenience of description, terms such as "remote interference" and "interference due to an atmospheric ducting phenomenon" are used interchangeably herein.

In order to solve problems arising from the absence of separate signal for detecting the remote interference and the identification of an interfering base station, which causes interference, for control of an interference situation is not performed, in certain embodiments according to this disclosure, remote interference is detected by means of a specific sequence capable of identifying individual base stations.

Figure 2:
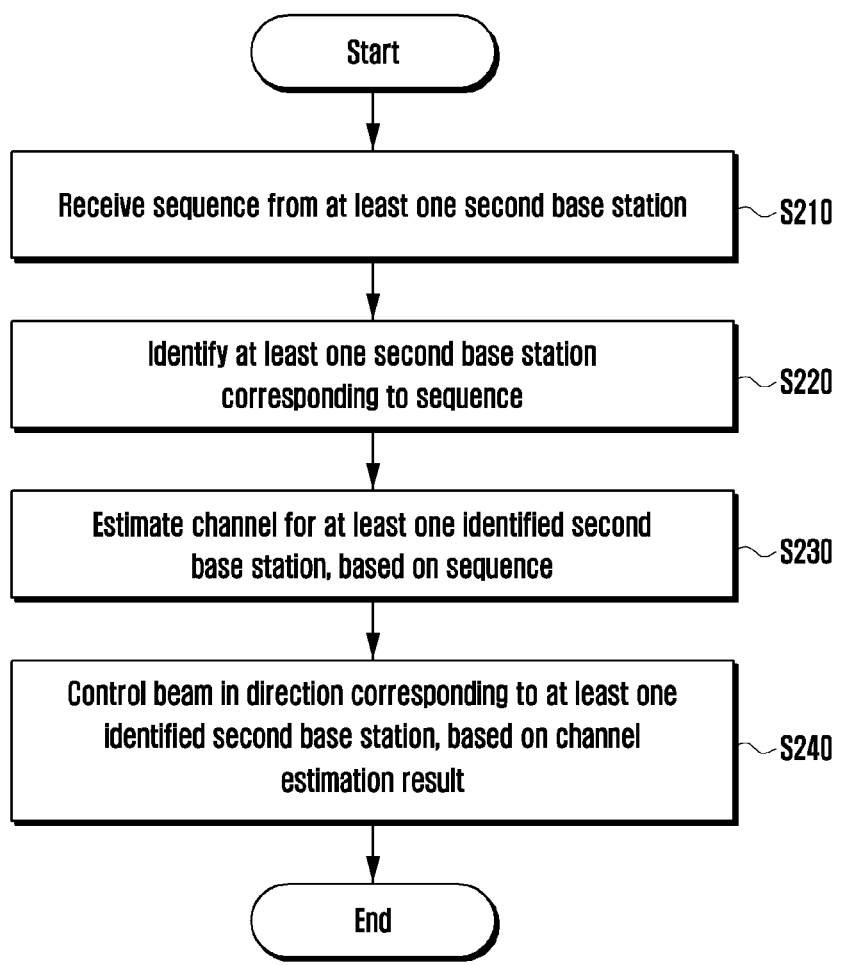
FIG. 2 is a flowchart illustrating an example of an operation of a first base station according to various embodiments of this disclosure.

FIG. 2 illustrates an example of operations of a first base station according to various embodiments of this disclosure, specifically, operations for measuring remote interference and controlling transmission and reception.

Referring to the non-limiting example of FIG. 2, a first base station may receive a sequence from at least one second base station (operation S210).

The first base station may be an interfering base station which causes the remote interference, or may be a victim base station which is affected by the remote interference. On the other hand, the at least one second base station may be an interfering base station which causes the remote interference, or may be a victim base station which is affected by the remote interference.

According to certain embodiments of this disclosure, a sequence capable of identifying each base station may be used as a signal for detecting the remote interference. As an example, sequences that one or more second base stations transmit may be generated based on cell identifications (IDs) of the second base stations, which enable identification of each of the second base stations. In addition, as an example, each of the second base stations may be identified based on an ID of a sequence transmitted for each of the second base stations. A method, according to various embodiments of this disclosure, of generating and transmitting a sequence for remote interference detection will be more further described with reference to FIGS. 7 to 16.

The first base station according to various embodiments of this disclosure may identify each of the second base stations by means of the received sequence (operation S220).

Sequences transmitted from the second base stations are transmitted in a downlink (DL) waveform of the second base stations, and thus a detector for detecting a cell ID from a sequence in the first base station should follow a downlink receiver structure. For example, in a detector of the first base station, a 7.5 kHz shift function required for an uplink (UL) receiver structure may be omitted, and the detector should receive a sequence in an OFDM waveform, rather than a discrete Fourier transform-spread-orthogonal frequency division multiplexing (DFT-s-OFDM) waveform. In this non-limiting example, since, in the case of new radio (NR), UL and DL waveforms are the same as each other as a cyclic-prefix-based OFDM (CP OFDM), a detector of the first base station may employ a receiver structure of a base station of UL as it is.

In addition, the first base station according to various embodiments of this disclosure may estimate a channel for each of the second base stations by using the received sequences (operation S230).

The first base station according to various embodiments of this disclosure may perform an operation of controlling beams in directions corresponding to the identified second base stations, based on a result of the channel estimation (operation S240).

For example, the first base station according to various embodiments of this disclosure may identify the direction and location of the remote interference relative to the first base station through a channel estimation result relating to a sequence transmitted from each of the second base stations.

The first base station according to various embodiments of this disclosure may analyze the remote interference by using not only the channel estimation result but also information on the second base stations, which have been identified based on the sequences of the second base stations. For example, if information on positions, directions, and distances of the second base stations relative to the first base station is stored in advance in the first base station or is acquired from a central management server, the first base station may identify a remote interference situation by using both the corresponding information and the channel estimation result.

As described above, when the remote interference situation is identified, control of a beam in a direction corresponding to a relevant second base station may be performed. The beam control operation may vary depending on whether the first base station is an interfering base station or a victim base station. This will be described later with reference to FIGS. 3 and 5.

Hereinafter, descriptions of operations overlapping those described in connection with FIG. 2 will be omitted or given briefly.

Figure 3:
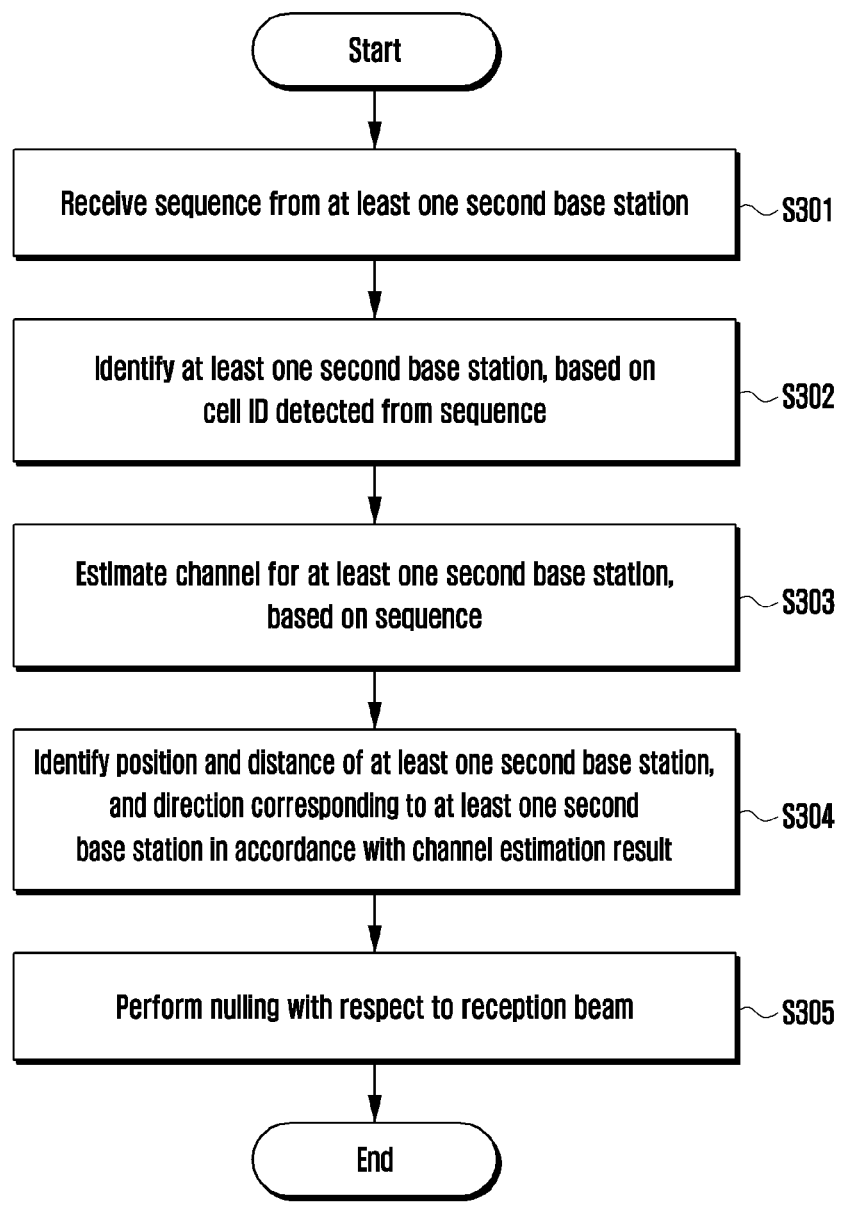
FIG. 3 illustrates, in flowchart format, an example of operations of detecting and controlling remote interference when a first base station according to various embodiments of this disclosure is a victim base station.
Figure 4:
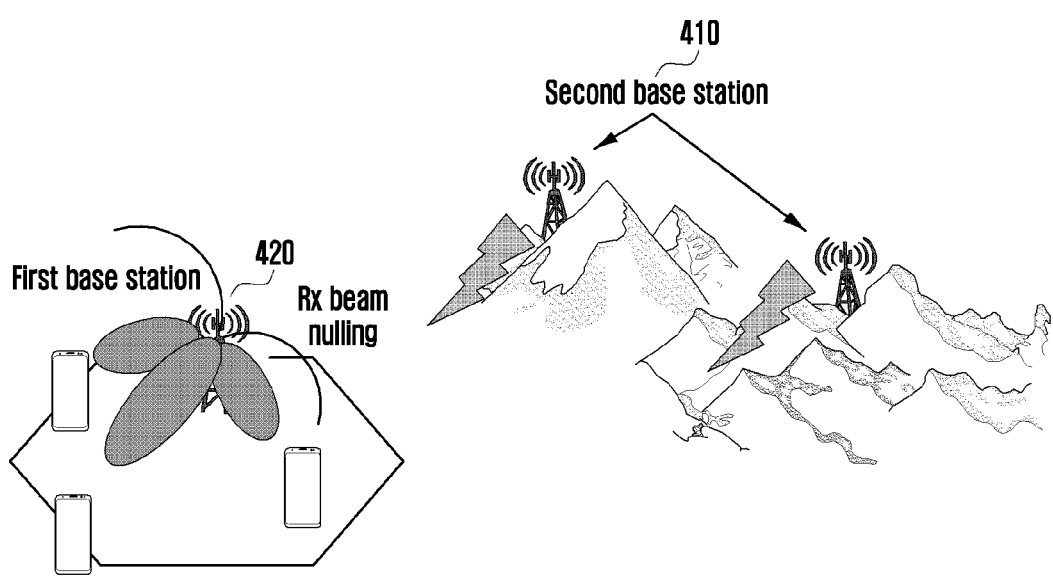
FIG. 4 is a conceptual diagram briefly illustrating a reception beam control operation of a first base station.

FIG. 3 illustrates, in flowchart format, an example of operations of detecting and controlling remote interference when a first base station according to various embodiments of this disclosure is a victim base station. FIG. 4 illustrates an example of a reception beam control operation of a first base station according to certain embodiments of this disclosure.

Referring to the non-limiting example of FIG. 3, a first base station according to various embodiments of this disclosure may receive a sequence transmitted from at least one second base station (operation S301), and may identify each of the second base stations, based on a cell ID detected from the sequence (operation S302).

For example, a first base station may receive sequences from one or more second base stations which may be causing the remote interference, and may identify each of the second base stations that transmitted the sequences, based on the received sequences. By way of non-limiting example, the first base station may store information on second base stations which correspond to respective cell IDs, or may acquire the information from a central management sever, and may thus identify the second base stations by using the information.

In various embodiments, the first base station may estimate a channel for each of the second base stations by using the received sequences (operation S303).

According to a result of the channel estimation, the first base station according to various embodiments of this disclosure may identify the position and direction of, and distance to, the second base station which causes the remote interference on an uplink signal of the first base station (operation S304).

For example, the first base station according to various embodiments of this disclosure may identify which second base station causes the remote interference among the identified second base stations, based on a result of the channel estimation. More specifically, the first base station according to various embodiments of this disclosure may identify a channel state in a direction corresponding to each of the identified second base stations. According to the channel state corresponding to each of the identified second base stations, the direction of and the distance to the second base station, which causes the remote interference, relative to the first base station may be identified.

As described above, when the second base station that is causing the remote interference is identified, the first base station according to various embodiments of this disclosure may perform a nulling operation with respect to a reception beam (operation S305).

More specifically, the first base station according to various embodiments of this disclosure may control, based on the identified result, beam shapes of reception beams such that a beam is not received in the direction corresponding to the second base station which causes the remote interference. As a non-limiting example of a representative reception beamforming algorithm for performing the nulling operation, a zero-forcing algorithm may be employed.

Referring to the illustrative example of FIG. 4, when directions or distances of second base stations 410 causing the remote interference are identified, a first base station 420 according to various embodiments of this disclosure may perform a beam nulling operation such that a reception beam is not formed throughout an entire predetermined angular range in the identified directions corresponding to the second base stations 410, and the reception beam is formed only over the remaining angular range.

Figure 5:
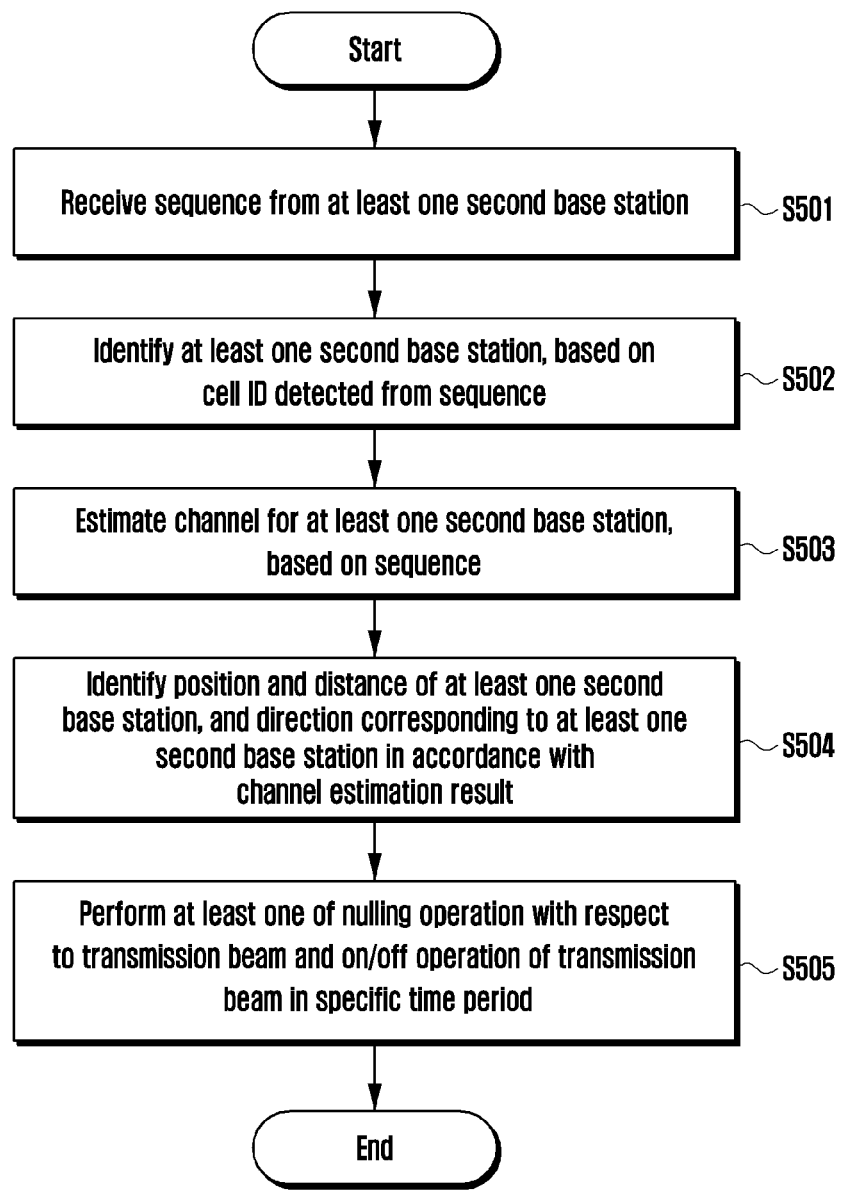
FIG. 5 illustrates, in flowchart format, an example of a beam control operation with respect to a victim base station when a first base station according to various embodiments of this disclosure is an interfering base station.
Figure 6A:
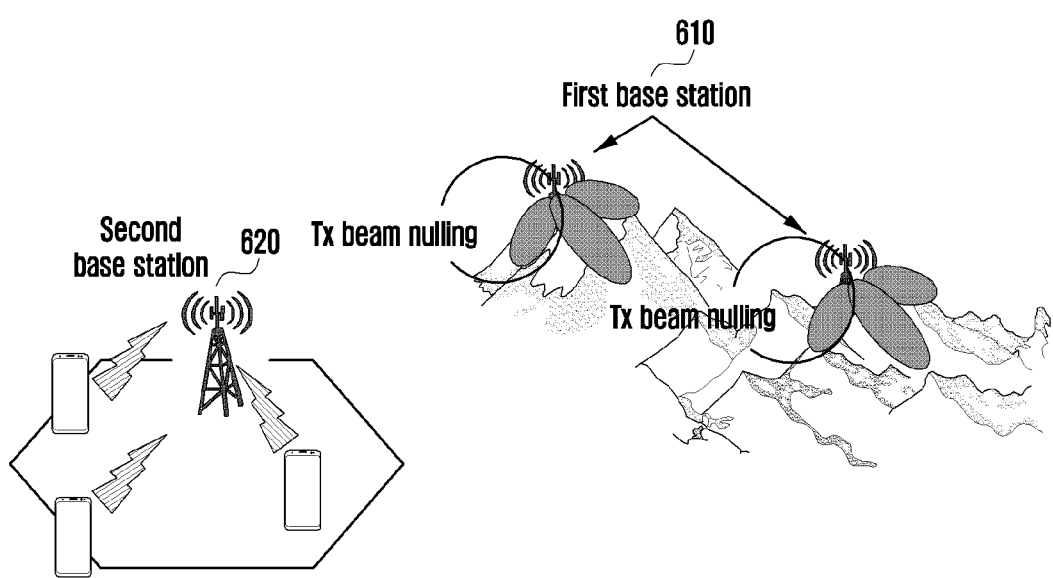
FIG. 6A is a conceptual diagram briefly illustrating a transmission beam control operation of a first base station.
Figure 6B:
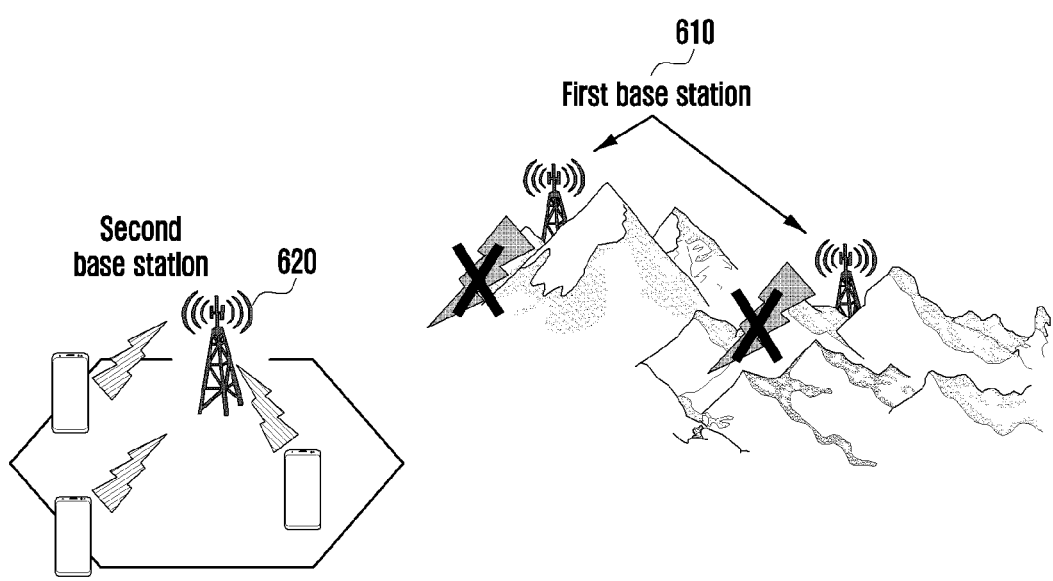
FIG. 6B is a conceptual diagram briefly illustrating a transmission beam control operation of a first base station.

FIG. 5 illustrates, in flowchart format, an example of a beam control operation with respect to a victim base station when a first base station according to various embodiments of this disclosure is an interfering base station. FIG. 6A is a conceptual diagram illustrating an example of a transmission beam control operation of a first base station according to some embodiments of this disclosure, and FIG. 6B is a conceptual diagram illustrating an example of a transmission beam control operation of a first base station.

A first base station according to various embodiments of this disclosure may receive sequences transmitted from one or more second base stations (operation S501), and may identify each of the second base stations, based on cell IDs detected from the sequences (operation S502).

For example, a first base station is a base station that may be causing the remote interference, may receive sequences from one or more second base stations affected by the remote interference, and may identify each of the second base stations that transmitted the sequences, based on the received sequences. As an illustrative example, the first base station may store information on second base stations which correspond to respective cell IDs, or may acquire the information from a central management sever, and may thus identify the second base stations by using the information.

In addition, the first base station according to various embodiments of this disclosure may estimate a channel for each of the second base stations by using the received sequences (operation S503).

According to a result of the channel estimation, the first base station according to various embodiments of this disclosure may identify the position and direction of, and distance to, a second base station which is affected by the remote interference of a downlink signal of the first base station (operation S504).

As a non-limiting example, the first base station according to various embodiments of this disclosure may identify which second base station is affected by the remote interference from the first base station among the identified second base stations, based on a result of the channel estimation. More specifically, the first base station according to various embodiments of this disclosure may identify a channel state in a direction corresponding to each of the identified second base stations. According to the channel state corresponding to each of the identified second base stations, the direction of and the distance to a second base station, which is affected by the remote interference, relative to the first base station may be identified.

As described above, when the second base station that is affected by the remote interference is identified, the first base station according to various embodiments of this disclosure may perform at least one operation among a nulling operation with respect to a transmission beam and an on/off operation of a transmission beam in a specific time period (operation S505).

The first base station according to various embodiments of this disclosure may control, based on the identified result, beam shapes of transmission beams such that a beam is not transmitted in a direction corresponding to the second base station that is affected by the remote interference. As an illustrative example of a representative transmission beamforming algorithm for performing the nulling operation, similar to a reception beamforming algorithm, a zero-forcing algorithm may be employed.

Referring to the illustrative example of FIG. 6A, when the direction of, or the distance to, a second base station 620 affected by the remote interference is identified, a first base station 610 according to various embodiments of this disclosure may perform a beam nulling operation such that a transmission beam is not formed throughout an entire predetermined angular range in a direction corresponding to the identified second base station 620.

Referring to the non-limiting example of FIG. 6B, the first base station 610 according to various embodiments of this disclosure may perform a beam control operation such that a transmission beam is not transmitted in a specific time period when the first base station 610 has a low frequency of operation. For example, the first base station 610 may operate to turn off a transmission beam in a time period having a low frequency of use, such as in the early morning, and to turn on a transmission beam in a remaining time period.

In the examples described above, the operations of nulling and turning on/off a transmission beam are disclosed as an independent operation. However, embodiments according to this disclosure are not limited thereto, and in some embodiments, these two operations may be performed together. For example, the first base station may operate to turn off a transmission beam in a specific time period, and, in a time period other than the specific time period, may operate according to a method of nulling a transmission beam in a direction corresponding to the second base station affected by the remote interference.

As described above, according to various embodiments of this disclosure, in remote interference detection and interference control operations, because a sequence generated from a cell ID of a base station is used, base stations related to the interference may be identified, and the interference situation that each of the base stations causes may be more accurately identified through channel estimation. For example, a more effective interference control operation can be performed because, beyond simply identifying an average interference result of base stations related to the interference, the positions, distances, and directions of the base stations related to the interference may be accurately identified for each of the base stations.

Hereinafter, a method for generating a sequence used for remote interference detection and a method for transmitting the sequence according to various embodiments of this disclosure will be described.

The remote interference due to an atmospheric ducting phenomenon described in the disclosure indicates the case where one base station is affected by a downlink signal of another base station, which is remotely located, and the effect may vary depending on the distance between an interfering base station and a victim base station, and thus a sequence which is capable of covering various distances, namely, is robust against a delay spread, is required to be transmitted. In addition, the distance between an interfering base station and a victim base station is approximately tens to hundreds of kilometers, and thus, in order to cover the entire distance, a sequence having a characteristic of a long cyclic prefix (CP) should be transmitted.

In an existing LTE framework, the length of a CP is set forth as a standard, and in certain embodiments according to this disclosure, a method for designing a sequence having a long CP which is nonstandard is provided. The sequence according to certain embodiments of this disclosure follows a method for connecting symbols, which correspond to respective sequences, by using a cyclic shift characteristic.

Figure 7:
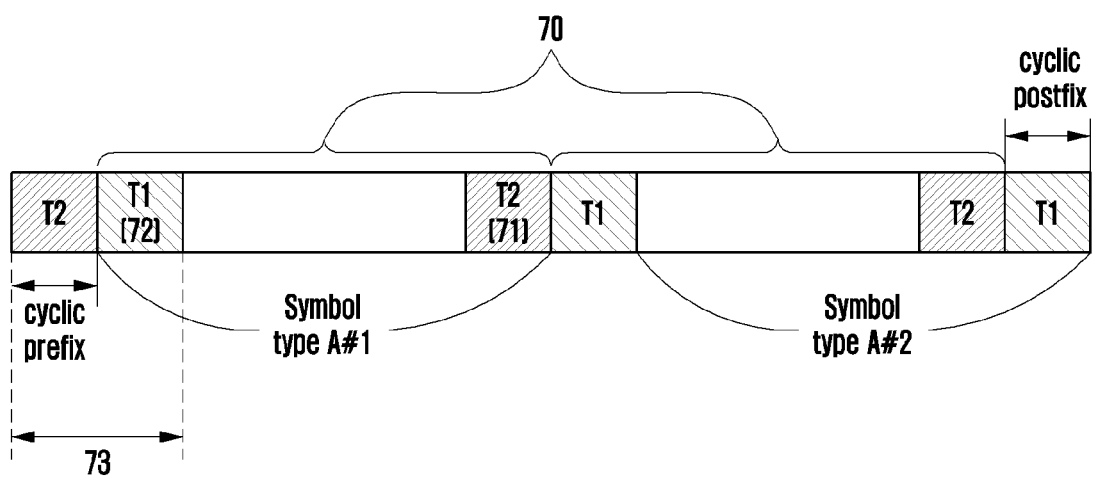
FIG. 7 is a diagram illustrating an example of symbols corresponding to two sequences, which are connected according to various embodiments of this disclosure.

FIG. 7 is a diagram illustrating an example of symbols corresponding to two sequences, which are connected according to various embodiments of this disclosure.

In general, in order to remove interference due to multiple paths between symbols, a cyclic prefix may be obtained by copying a portion of the rear end of a symbol corresponding to a signal and inserting the copied portion in front of the symbol. In the illustrative example of FIG. 7, when a symbol corresponding to one sequence is configured as a part marked by 70, a first part 71 (T2), which is a portion of the rear end of the corresponding symbol, is cyclic-shifted so as to be configured as a cyclic prefix in front of the corresponding symbol.

The sequence according to various embodiments of this disclosure may connect symbols which respectively correspond to two sequences to thus generate a sequence for remote interference detection. For example, after the inverse fast Fourier transform (IFFT) is performed, the second symbol, among symbols corresponding to two sequences, is cyclic-shifted by T1 before a cyclic prefix is attached, whereby two OFDM symbols corresponding to the two sequences may be connected to each other.

More specifically, referring to the explanatory example of FIG. 7, in order to connect symbols corresponding to two sequences, a first part 71 of the rear end of a symbol 70 corresponding to one sequence is cyclic-shifted to be configured as a cyclic prefix of the first symbol, and a second part 72 of the front end of the symbol 70 is cyclic-shifted to be configured as a cyclic postfix of the second symbol. In this configuration, a long CP of a part 73 (T1+T2) may be formed according to each of symbol types (type A #1 and type A #2). For example, the length of the part (T1+T2) may be approximately 10 μs.

Therefore, even if a delay spread increases, a base station receiving the corresponding sequence can detect a part that is not affected by the interference even when the base station tries to decode any part of a connected symbol.

A sequence according to various embodiments of this disclosure may connect many symbols in order to strengthen resistance to a delay spread.

Figure 8B:
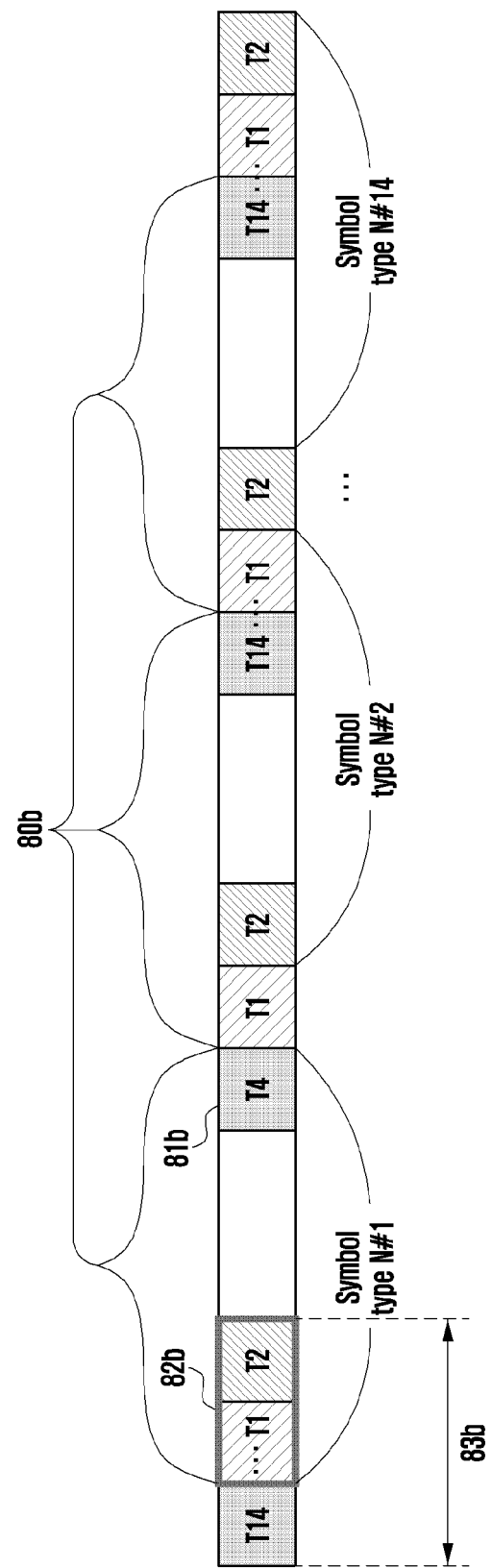
FIG. 8B is a diagram illustrating an example of symbols corresponding to fourteen sequences, which are connected according to various embodiments of this disclosure.

FIG. 8A is a diagram illustrating an example of symbols corresponding to three sequences, which are connected according to various embodiments of this disclosure, and FIG. 8B is a diagram illustrating an example of symbols corresponding to fourteen sequences, which are connected according to various embodiments of this disclosure.

Referring to the non-limiting example of FIG. 8A, as previously described with reference to FIG. 7, in order to connect symbols corresponding to three sequences, a first part 81a (T3) of the rear end of a symbol 80a corresponding to one sequence is cyclic-shifted to be configured as a cyclic prefix of the first symbol, and a second part 82a (T1+T2) of the front end of the symbol 80a is cyclic-shifted to be configured as a cyclic postfix of the third symbol. In this configuration, a long CP of a part 83a (T1+T2+T3) may be formed according to each of symbol types (type B #1, type B #2, and type B #3). For example, the length of the part (T1+T2+T3) may be approximately 15 μs.

Referring to the non-limiting example of FIG. 8B, in order to connect symbols corresponding to fourteen sequences, a first part 81b (T14) of the rear end of a symbol 80b corresponding to one sequence is cyclic-shifted to be configured as a cyclic prefix of the first symbol, and a second part 82b (T1+T2+ . . . +T13) of the front end of the symbol 80b is cyclic-shifted to be configured as a cyclic postfix of the last symbol, among connected symbols. In this configuration, a long CP of a part 83b (T1+T2+ . . . +T14) may be formed according to each of symbol types (type N #1, type N #2, . . . , and type N #14). In the embodiment, a long CP sequence in which one symbol is used as a CP may be generated.

As the number of connected symbols increases, it may be identified that the length of a cyclic postfix (which corresponds to a portion of the front end of a symbol corresponding to one sequence, that is, a second part in the description of the drawings above) which is inserted to the last symbol increases.

As described in the drawings above, according to certain embodiments of this disclosure, even if a delay spread occurs, sequences are connected to form a sequence having a long CP, and a base station having received a sequence from another base station far therefrom can thus detect a part which is not affected by interference even when the base station tries to decode any part of symbols corresponding to the connected sequences.

Referring to FIGS. 9 to 16, examples in which a sequence generated according to various embodiments of this disclosure is transmitted on resources including time and frequency will be described. Hereinafter, with reference to one transmission time interval (TTI), the position of a resource on which sequences are transmitted will be described.

Figure 9:
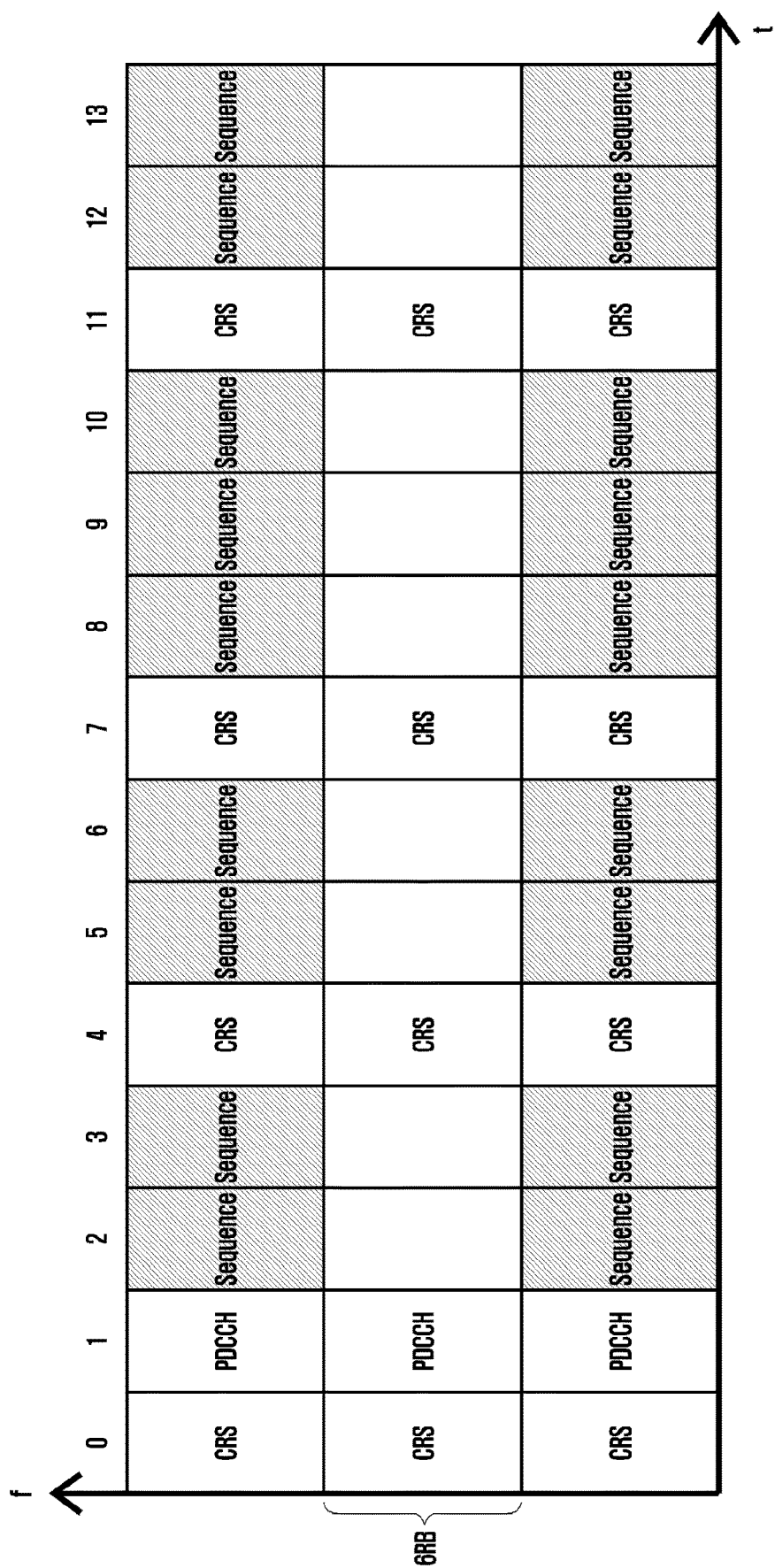
FIG. 9 is a diagram illustrating an example in which sequences may be transmitted in a general downlink subframe.

FIG. 9 is a diagram illustrating an example in which sequences may be transmitted in a general downlink subframe, according to some embodiments of this disclosure.

Referring to FIG. 9, a sequence according to various embodiments of this disclosure may be mapped to symbols other than symbols to which a cell-specific reference signal (CRS) and a physical downlink control channel (PDCCH) are mapped, and may then be transmitted. In FIG. 9, the horizontal axis is a time domain, in which one division indicates one symbol, and the vertical axis is a frequency domain, in which one division may correspond to a plurality of resource blocks (RBs).

For example, as illustrated in the example of FIG. 9, in a downlink subframe, a sequence may be transmitted in the 2nd, 3rd, 5th, 6th, 8th, 9th, 10th, 12th, and 13th symbols. In this case, sequences transmitted in symbols in which a sequence can be transmitted may be determined according to the lengths of connected symbols corresponding to the corresponding sequences.

For example, even within the same TTI, symbols of type A #1 and type A #2 such as illustrated in the non-limiting example of FIG. 7 may be mapped to the 2nd and 3rd symbols in a connected state, and symbols of type B #1, type B #2, and type B #3 of FIG. 8A may be mapped to the 8th, 9th, and 10th symbols in a connected state.

In addition, it is possible that symbols of type N #1, type N #2, type N #4, type N #5, type N #7, type N #8, type N #9, type N #11, and type N #12, which are described in FIG. 8B, are mapped to nine symbols, namely the 2nd, 3rd, 4th, 5th, 6th, 8th, 9th, 12th, and 13th symbols, and then transmitted.

Meanwhile, in FIG. 9, with reference to the frequency domain, a sequence according to various embodiments of this disclosure may not be mapped to the middle space. For example, a frequency region corresponding to the middle space is a part corresponding to a bandwidth of approximately 6 RBs including the center frequency, and may be a section in which a synchronization signal for downlink synchronization is received. Because a sequence according to various embodiments of this disclosure is not mapped to this section, a remote interference control operation can be effectively performed even using a current communication standard, that is, without changing the communication standard.

Meanwhile, because a sequence according to various embodiments of this disclosure is also mapped to the frequency region of 6 RBs including the center frequency and is then transmitted, an embodiment for further strengthening the remote interference control operation may be also considered. In addition, as an example, a sequence having a predetermined length may be mapped to a subcarrier of any successive frequency, regardless of the position on the frequency region.

Although not illustrated in FIG. 9, embodiments in which, in a frequency region other than the 6 RBs, a corresponding sequence is also mapped to a symbol (a time region) in which a PDCCH or a CRS is transmitted and is then transmitted may be also considered. For example, a first base station according to various embodiments of this disclosure may map a sequence according to various embodiments of this disclosure to a symbol regardless of whether a reference signal and a control signal are mapped to the corresponding symbol. That is, a sequence according to various embodiments of this disclosure may be also mapped to a symbol in which the reference signal and the control signal are transmitted.

Hereinafter, in a DL framework, symbols in which sequences can be transmitted according to each type of a CP and each type of a subframe will be described. In the illustrative examples of FIGS. 10 to 16, multiple sequence signals may be assigned according to a frequency-division-multiplexing method, and in addition, in order to strengthen an interference characteristic, a method for assigning one sequence to the entire wideband without frequency-division multiplexing may be employed.

Figure 10:
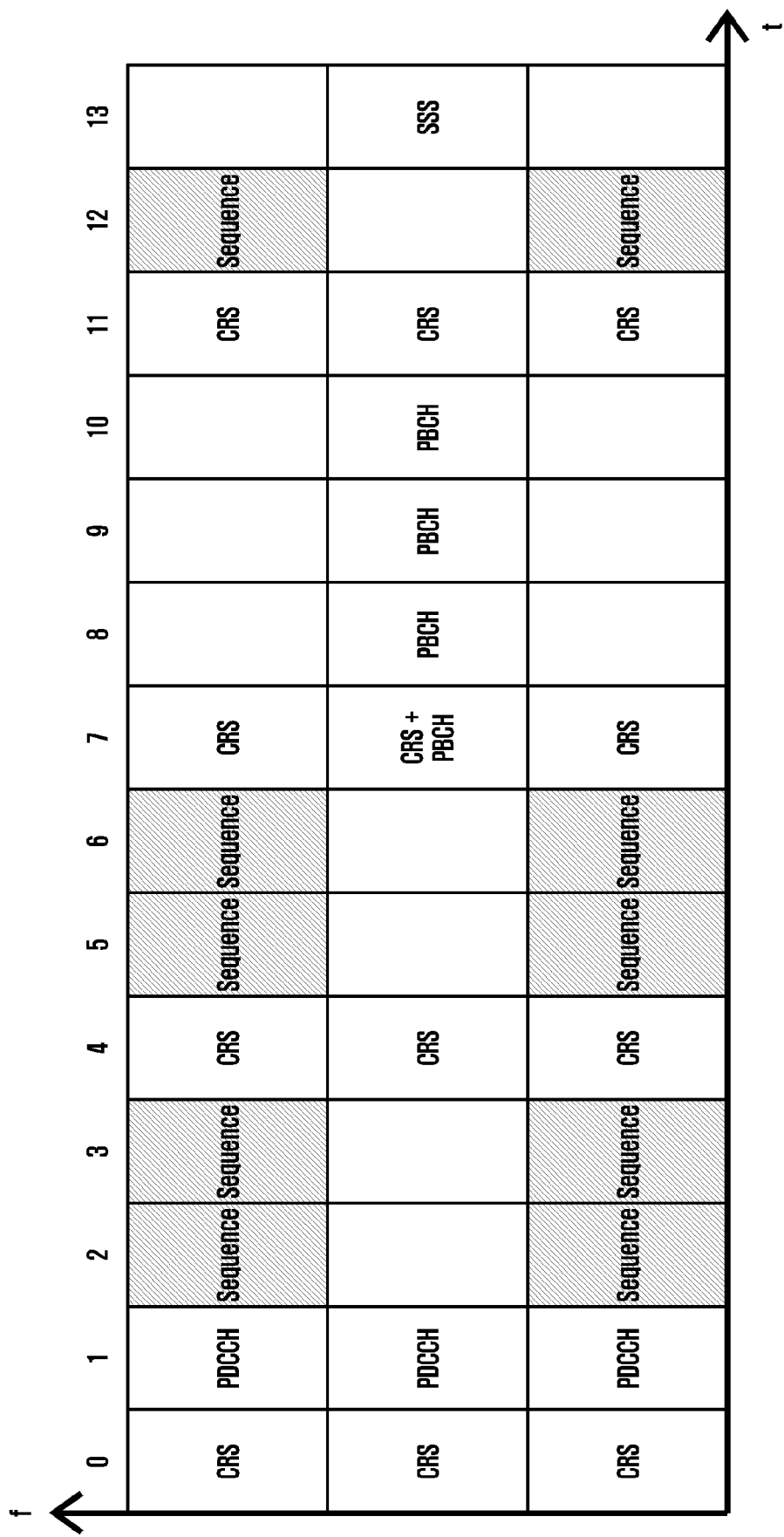
FIG. 10 is a diagram illustrating an example of sequence transmission in subframe #0 to which a general CP is applied according to certain embodiments of this disclosure.

FIG. 10 is a diagram illustrating an example of sequence transmission in subframe #0 to which a general CP is applied, according to certain embodiments of this disclosure.

Referring to the illustrative example of FIG. 10, in subframe #0, a sequence according to various embodiments of this disclosure may be mapped to symbols other than symbols to which a CRS, a PDCCH, a PBCH, and an SSS are mapped, and may then be transmitted. As described above, a sequence according to various embodiments of this disclosure may not be mapped to a frequency region in which the PBCH and the SSS are transmitted.

For example, as illustrated in FIG. 10, a sequence according to various embodiments of this disclosure may be mapped to the 2nd, 3rd, 5th, 6th, and 12th symbols, among symbols in which the CRS and the PDCCH are not transmitted. In this case, the sequence may not be mapped to symbols (for example, the 7th to 11th symbols) including a frequency region adjacent to the frequency region to which the PBCH is mapped.

As an illustrative example, symbols corresponding to two sequences may be connected to each other and mapped to the 2nd and 3rd symbols, and symbols corresponding to three sequences may be connected to each other and mapped to the 5th, 6th, and 12th symbols.

Figure 11:
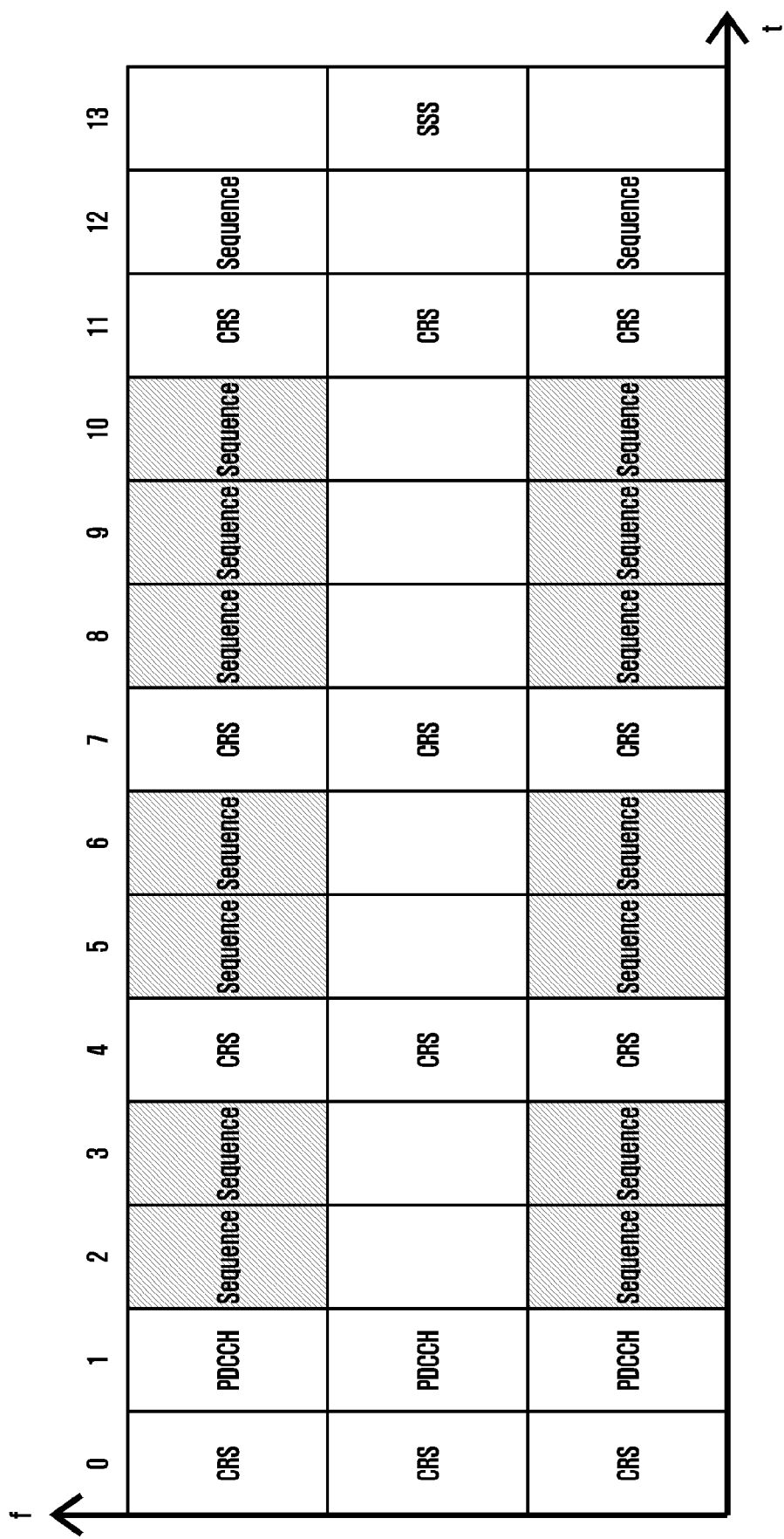
FIG. 11 is a diagram illustrating an example of sequence transmission in subframe #5 to which a general CP is applied according to certain embodiments of this disclosure.

FIG. 11 is a diagram illustrating an example of sequence transmission in subframe #5 to which a general CP is applied, according to certain embodiments of this disclosure.

Referring to the non-limiting example of FIG. 11, in subframe #5, a sequence according to various embodiments of this disclosure may be mapped to symbols other than symbols to which a CRS, a PDCCH, and an SSS are mapped, and may then be transmitted. For example, as illustrated in FIG. 11, a sequence according to various embodiments of this disclosure may be mapped to the 2nd, 3rd, 5th, 6th, 8th, 9th, and 10th symbols, among symbols in which the CRS and the PDCCH are not transmitted. In this case, the sequence may not be mapped to a symbol (for example, the 13th symbol) including a frequency region adjacent to the frequency region to which the SSS is mapped.

Figure 12:
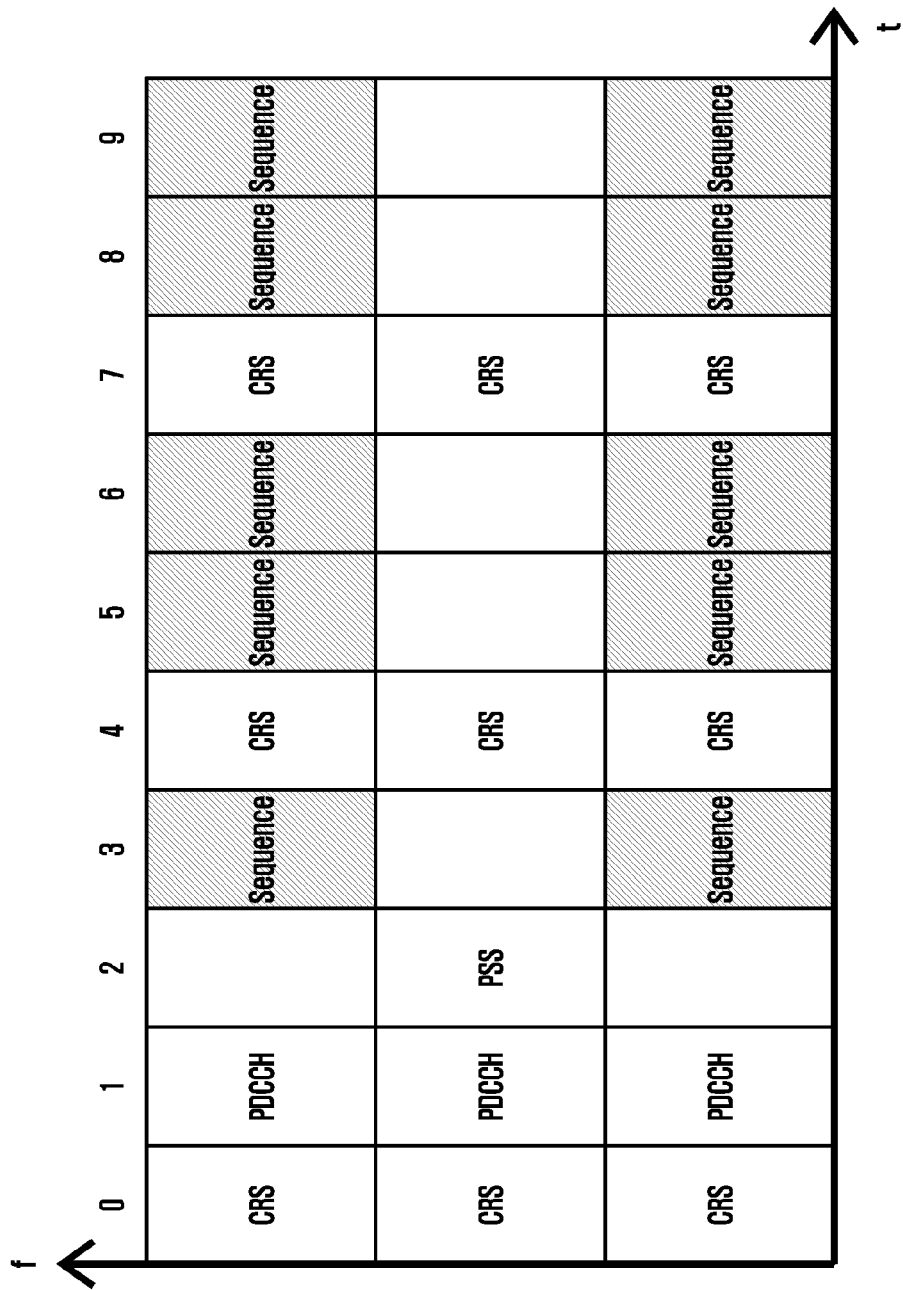
FIG. 12 is a diagram illustrating an example of sequence transmission in a special subframe to which a general CP is applied according to various embodiments of this disclosure.

FIG. 12 is a diagram illustrating an example of sequence transmission in a special subframe to which a general CP is applied, according to certain embodiments of this disclosure.

Referring to the non-limiting example of FIG. 12, in a special subframe, a sequence according to various embodiments of this disclosure may be mapped to symbols other than symbols to which a CRS, a PDCCH, and a PSS are mapped, and may then be transmitted. For example, as illustrated in FIG. 12, a sequence according to various embodiments of this disclosure may be mapped to the 3rd, 5th, 6th, 8th, and 9th symbols, among symbols in which the CRS and the PDCCH are not transmitted. In this case, in a frequency region adjacent to the frequency region to which the PSS is mapped, the sequence may not be mapped to the same symbol (for example, the 2nd symbol) as the symbol to which the PSS is mapped.

Figure 13:
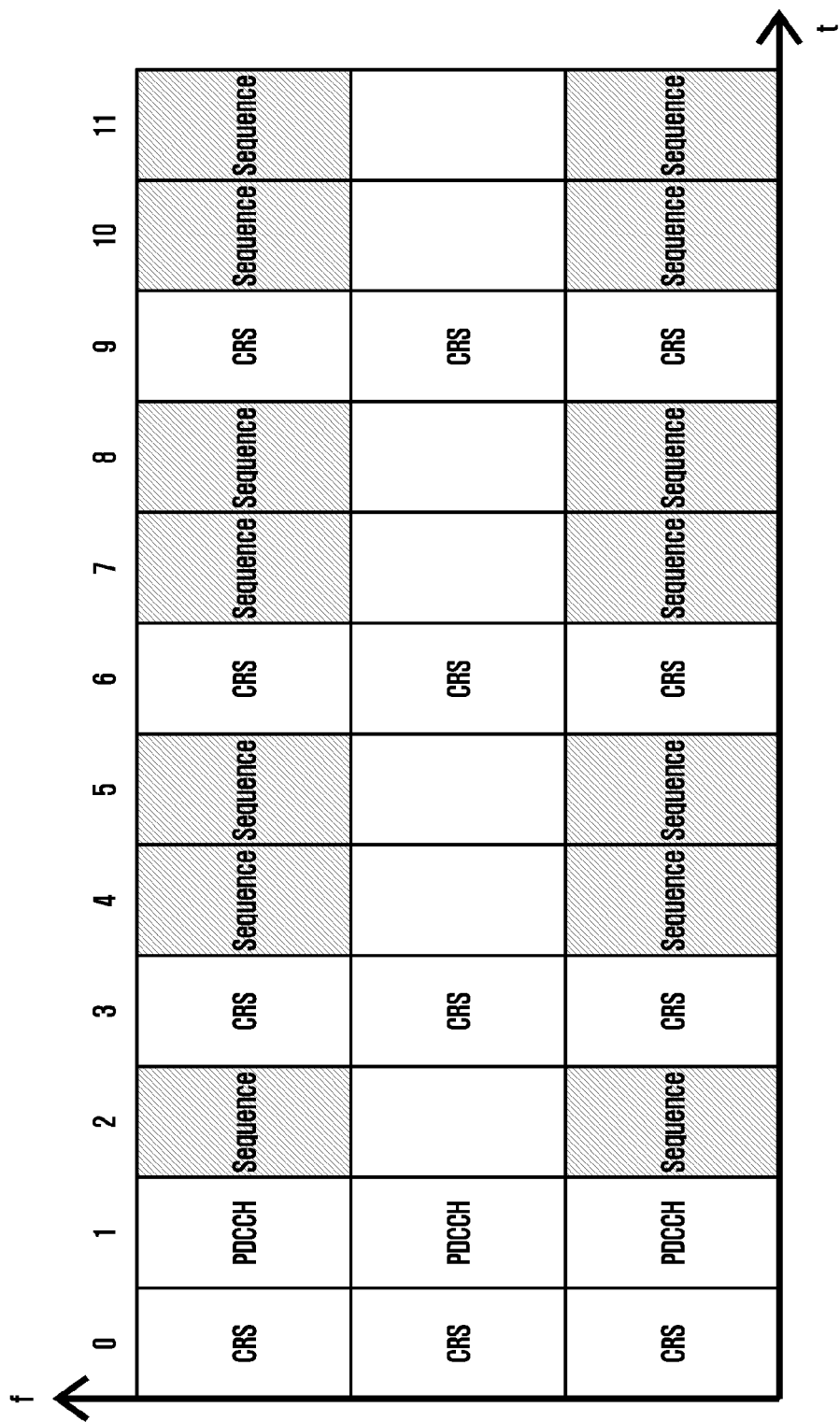
FIG. 13 is a diagram illustrating an example of sequence transmission in a downlink subframe to which an extended CP is applied according to some embodiments of this disclosure.

FIG. 13 is a diagram illustrating an example of sequence transmission in a downlink subframe to which an extended CP is applied, according to various embodiments of this disclosure.

Referring to the non-limiting example of FIG. 13, in a downlink subframe, a sequence according to various embodiments of this disclosure may be mapped to symbols other than symbols to which a CRS and a PDCCH are mapped, and may then be transmitted.

For example, as illustrated in the example of FIG. 13, a sequence according to various embodiments of this disclosure may be mapped to the 2nd, 4th, 5th, 7th, 8th, 10th, and 11th symbols, among symbols in which the CRS and the PDCCH are not transmitted. In this case, the sequence according to various embodiments of this disclosure may be mapped to all resources within a corresponding subframe, except for a frequency region part including the center frequency described above.

Figure 14:
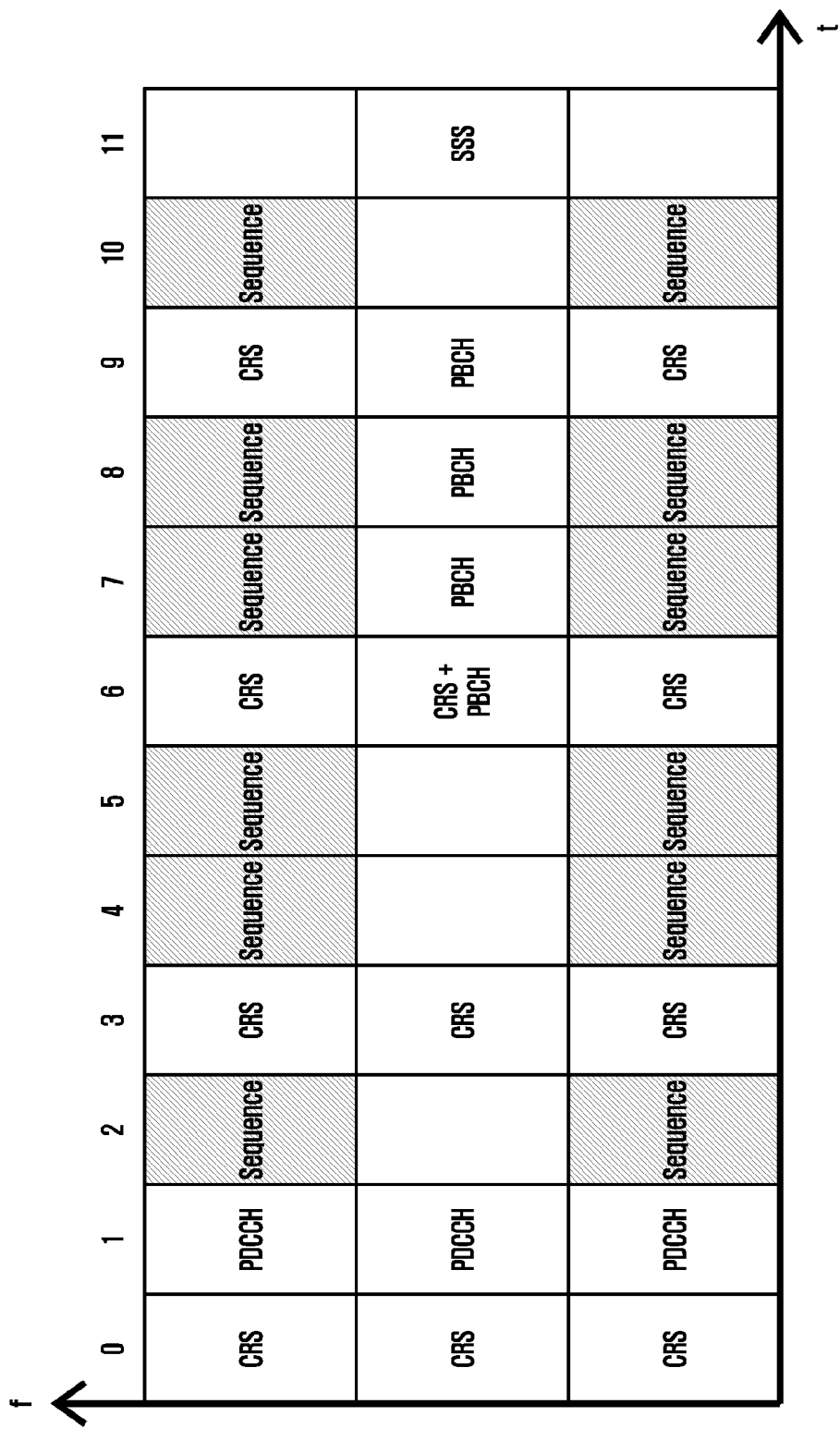
FIG. 14 is a diagram illustrating an example of sequence transmission in subframe #0 to which an extended CP is applied according to some embodiments of this disclosure.

FIG. 14 is a diagram illustrating an example of sequence transmission in subframe #0 to which an extended CP is applied according to at least one embodiment of this disclosure.

Referring to the non-limiting example of FIG. 14, in subframe #0, a sequence according to various embodiments of this disclosure may be mapped to symbols other than symbols to which a CRS, a PDCCH, a PBCH, and an SSS are mapped, and may then be transmitted. For example, as illustrated in FIG. 14, a sequence according to various embodiments of this disclosure may be mapped to the 2nd, 4th, 5th, 7th, 8th, and 10th symbols, among symbols in which the CRS and the PDCCH are not transmitted. In this case, the sequence may not be mapped to a frequency region to which the PBCH and the SSS are mapped. In addition, in a frequency region adjacent to the frequency region to which the SSS is mapped, the sequence may not be mapped to the same symbol as the symbol to which the SSS is mapped.

Figure 15:
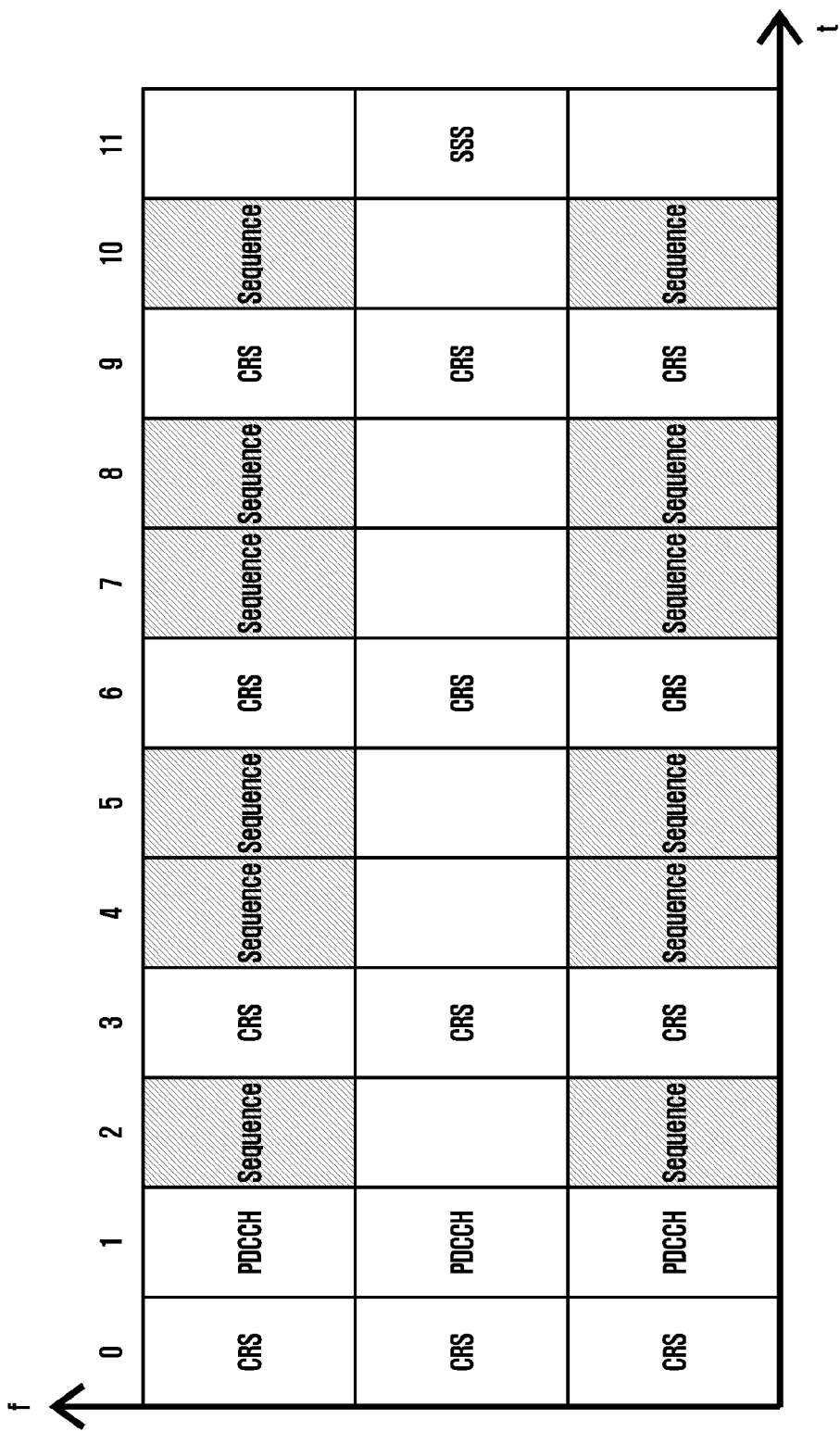
FIG. 15 is a diagram illustrating an example of sequence transmission in subframe #5 to which an extended CP is applied according to various embodiments of this disclosure.

FIG. 15 is a diagram illustrating an example of sequence transmission in subframe #5 to which an extended CP is applied according to some embodiments of this disclosure.

Referring to the non-limiting example of FIG. 15, in subframe #5, a sequence according to various embodiments of this disclosure may be mapped to symbols other than symbols to which a CRS, a PDCCH, and an SSS are mapped, and may then be transmitted. For example, as illustrated in FIG. 15, a sequence according to various embodiments of this disclosure may be mapped to the 2nd, 4th, 5th, 7th, 8th, and 10th symbols, among symbols in which the CRS and the PDCCH are not transmitted. As shown in FIG. 14, in a frequency region adjacent to the frequency region to which the SSS is mapped, the sequence may not be mapped to the same symbol as the symbol to which the SSS is mapped.

Figure 16:
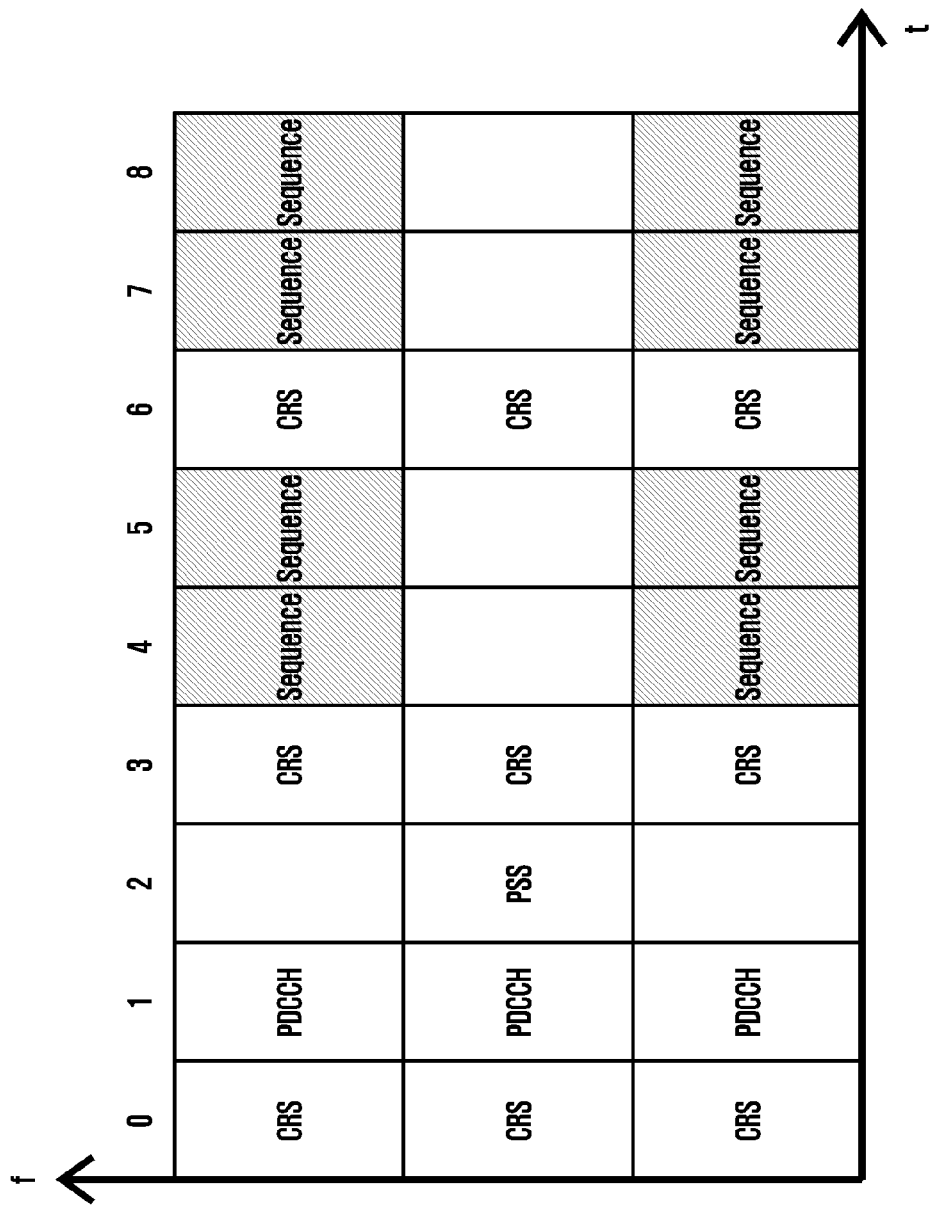
FIG. 16 is a diagram illustrating an example of sequence transmission in a special subframe to which an extended CP is applied according to certain embodiments of this disclosure.

FIG. 16 is a diagram illustrating an example of sequence transmission in a special subframe to which an extended CP is applied, according to various embodiments of this disclosure.

Referring to the non-limiting example of FIG. 16, in a special subframe, a sequence according to various embodiments of this disclosure may be mapped to symbols other than symbols to which a CRS, a PDCCH, and a PSS are mapped, and may then be transmitted. For example, as illustrated in FIG. 16, a sequence according to various embodiments of this disclosure may be mapped to the 4th, 5th, 7th, and 8th symbols, among symbols in which the CRS and the PDCCH are not transmitted. In a frequency region adjacent to the frequency region to which the PSS is mapped, the sequence may not be mapped to the same symbol (for example, the 2nd symbol) as the symbol to which the PSS is mapped.

The drawings described above illustrate only embodiments in which a sequence according to various embodiments of this disclosure is not transmitted in a section in which a synchronization signal for downlink synchronization is received, namely in the section corresponding to a bandwidth of approximately 6 RBs including the center frequency. However, the disclosure is not limited thereto, and a sequence may also be mapped to a corresponding frequency region, and may then be transmitted.

Figure 17:
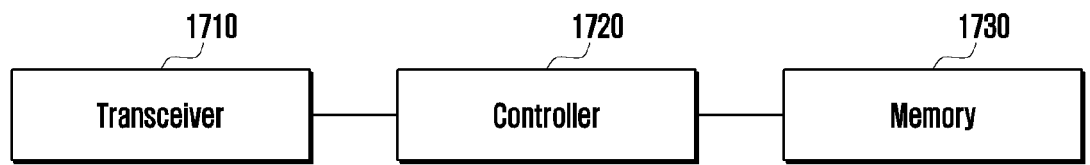
FIG. 17 illustrates, in block diagram format, an example of a configuration of a base station which performs an operation according to various embodiments of this disclosure.

FIG. 17 illustrates, in block diagram format, an example of a configuration of a base station which performs an operation according to various embodiments of this disclosure.

Referring to the non-limiting example of FIG. 17, a base station according to various embodiments of this disclosure may include a transceiver 1710, a controller 1720, and a storage unit 1730. The base station according to various embodiments of this disclosure may include both an interfering base station and a victim base station.

The transceiver 1710 of the base station of the disclosure may perform wireless communication with at least one external entity. For example, the transceiver 1710 of the disclosure may transmit a wireless signal to or receive the same from an external device, or may transmit a sequence for remote interference detection according to various embodiments of this disclosure to or receive the same from an external device.

The controller 1720 according to various embodiments of this disclosure may control the overall operation of the base station according to various embodiments of this disclosure. For example, the controller 1720 may control the transceiver 1710 to transmit a sequence for remote interference detection to another base station, or may receive the sequence from another base station. In addition, when the transceiver 1710 receives a sequence from another base station, the controller 1720 according to various embodiments of this disclosure may identify the other base station by using a cell ID detected in the corresponding sequence. In addition, upon estimating a channel by using the corresponding sequence, the controller 1720 may control the transceiver 1710 to control a transmission beam or a reception beam corresponding to a direction related to the remote interference, based on a result of the channel estimation.

The storage unit 1730 according to various embodiments of this disclosure stores data such as configuration information, an application, and a basic program for the operation of the base station. As an example, the storage unit 1730 according to various embodiments of this disclosure may store information on a cell ID corresponding to each base station, information on the position of each base station, and the like, and, when the base station is an interfering base station, may store information on the time during which a corresponding base station does not operate.

FIG. 18 illustrates an example of a relationship between a central server and base stations according to various embodiments of this disclosure.

Operations of detecting and controlling remote interference according to various embodiments of this disclosure may be performed at each base station, but may be performed through a separate central server, namely a remote interference management (RIM) server.

Referring to the non-limiting example of FIG. 18, a RIM server according to various embodiments of this disclosure may be connected to each base station, and may receive information on the situation of each base station. For example, a RIM server 1803 illustrated in FIG. 18 may perform control such that at least one base station transmits a sequence in order to identify which base station operates as an interfering base station or a victim base station among a first base station 1801 and a second base station 1802. The RIM sever 1803 according to various embodiments of this disclosure may perform control such that a base station that receives a sequence from a base station that transmits the corresponding sequence detects the sequence and reports a channel estimation result.

For example, the RIM server 1803 may control the first base station 1801 to transmit a sequence, and may control the second base station 1802 to receive the sequence. In addition, the RIM server 1803 may perform control such that the second base station 1802 detects the sequence and reports a channel estimation result. Accordingly, the RIM server 1803 according to various embodiments of this disclosure may identify that the first base station 1801 is an interfering base station and the second base station 1802 is a victim base station.

Based on the identified result, the RIM server 1803 may transmit a command for controlling a beamforming operation of at least one of the first base station 1801 and the second base station 1802. For example, the RIM server 1803 may transmit, to the first base station 1801, a command for performing control such that a transmission beam in a direction corresponding to the second base station 1802 is nullified, or such that the corresponding transmission beam is not transmitted. In addition, the RIM server 1803 may transmit, to the second base station 1802, a command for performing control such that a reception beam in a direction corresponding to the first base station 1801 is nullified.

The embodiments are not limited thereto. For example, an operation of controlling beamforming may be performed using an on/off operation of each of the first base station and the second base station. The first base station or the second base station may perform control such that a beam corresponding to the direction in which the interference occurs is turned on or turned off in a specific time period. In addition, for example, the operation of controlling beamforming according to various embodiments of this disclosure may also be performed based on configuration information (for example, TDD configuration and the like) of each base station. The first base station according to various embodiments of this disclosure may transmit TDD configuration information including information for performing configuration such that a beam corresponding to the direction in which the interference occurs is not transmitted in a specific time period.

According to various embodiments of this disclosure, since control using a central server is performed, rather than simply considering an interference operation only between some base stations, data according to the operation of all relevant base stations can be collected, and the collected data can be applied to situations pertaining to all of the base stations, whereby the more suitable control is possible.

Those skilled in the art will appreciate that various modifications and changes may be made without departing from the essential spirit and scope of the disclosure. Therefore, the embodiments disclosed herein should be considered not from limitative viewpoints but from illustrative viewpoints. The scope of the disclosure should be determined not by the above description but by the appended claims, and all differences equivalent to the claims shall be construed as falling within the scope of the disclosure.

Although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first base station performing interference control in a wireless communication system, the method comprising:
   receiving a signal from at least one second base station;
   identifying a second base station of the at least one second base station corresponding to the signal;
   estimating a channel for the identified second base station, based on the signal; and
   controlling a beam in a direction corresponding to the identified second base station, based on a result of the estimated channel,
   wherein the signal includes at least two sequences connected to each other, the at least two sequences mapped to at least two adjacent symbols, and
   wherein a length of a cyclic postfix for the at least two adjacent symbols is determined based on a number of the at least two sequences.

2. The method of claim 1, wherein identifying the second base station comprises:
   identifying at least one of a sequence ID and a cell ID, based on the signal; and
   identifying the second base station corresponding to at least one of the identified sequence ID and cell ID.

3. The method of claim 1,
   wherein the at least two adjacent symbols are within one transmission time interval (TTI).

4. The method of claim 1,
   wherein a first part of a symbol corresponding to one sequence is configured as a cyclic prefix for the at least two adjacent symbols, and
   wherein a second part of the symbol corresponding to the one sequence is configured as the cyclic postfix for the at least two adjacent symbols.

5. The method of claim 4,
   wherein a length of the cyclic postfix for the at least two adjacent symbols is proportional to the number of the at least two symbols.

6. The method of claim 3,
   wherein the TTI includes a subframe, and
   wherein the at least two adjacent symbols are included in symbols in which a reference signal and a control signal are not transmitted within the subframe.

7. The method of claim 1, wherein, when the first base station is a base station which causes the interference, the controlling of the beam comprises performing a nulling operation on a transmission beam.

8. The method of claim 7, wherein controlling the beam further comprises performing an on/off operation on a transmission beam in a specific time period.

9. The method of claim 8, further comprising:
   transmitting, to a management server, the result of the estimated channel for the identified second base station,
   wherein the result of the estimated channel includes information on a position and a direction of the identified second base station, and a distance between the first base station and the identified second base station, and
   wherein the management server transmits a command for beam control to the identified second base station, based on the result of the estimated channel.

10. The method of claim 1, wherein, when the first base station is a base station which is affected by the interference, and controlling the beam comprises performing a nulling operation on a reception beam.

11. A first base station performing interference control in a wireless communication system, the first base station comprising:
   a transceiver; and
   a controller configured to:
      control the transceiver to receive a signal from at least one second base station,
      identify a second base station of the at least one second base station corresponding to the signal,
      estimate a channel for the identified second base station, based on the signal, and
      control a beam in a direction corresponding to the identified second base station, based on a result of the estimated channel,
   wherein the signal includes at least two sequences connected to each other, the at least two sequences being mapped to at least two adjacent symbols, and
   wherein a length of a cyclic postfix for the at least two adjacent symbols is determined based on a number of the at least two sequences.

12. The first base station of claim 11, wherein the controller is further configured to identify at least one of a sequence ID and a cell ID, based on the signal, and identify the second base station corresponding to at least one of the identified sequence ID and cell ID.

13. The first base station of claim 11,
   wherein the at least two adjacent symbols are within one transmission time interval (TTI).

14. The first base station of claim 11,
wherein a first part of a symbol corresponding to one sequence is configured as a cyclic prefix for the at least two adjacent symbols, and
wherein a second part of the symbol corresponding to the one sequence is configured as the cyclic postfix for the at least two adjacent symbols.

15. The first base station of claim 14, wherein a length of the cyclic postfix for the at least two adjacent symbols is proportional to the number of the at least two symbols.

16. The first base station of claim 13, wherein the TTI includes a subframe, and wherein the at least two adjacent symbols are included in symbols in which a reference signal and a control signal are not transmitted within the subframe.

17. The first base station of claim 11, wherein, when the first base station is a base station which causes the interference, the controller controls the transceiver to perform a nulling operation on a transmission beam.

18. The first base station of claim 17, wherein the controller controls the transceiver to perform an on/off operation on a transmission beam in a specific time period.

19. The first base station of claim 18,
wherein the controller is further configured to control the transceiver to transmit, to a management server, the result of the estimated channel for the identified second base station,
wherein the result of the estimated channel includes information on a position and a direction of the identified second base station, and a distance between the first base station and the identified second base station, and
wherein the management server transmits a command for beam control to the identified second base station, based on the result of the estimated channel.

20. The first base station of claim 11, wherein, when the first base station is a base station which is affected by the interference, the controller controls the transceiver to perform a nulling operation on a reception beam.

* * * * *